(12) United States Patent
Saitoh et al.

(10) Patent No.: US 7,380,866 B2
(45) Date of Patent: Jun. 3, 2008

(54) DOOR CONSTRUCTION FOR VEHICLE

(75) Inventors: Hajime Saitoh, Shioya-gun (JP); Tomofumi Ichinose, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/612,839

(22) Filed: Dec. 19, 2006

(65) Prior Publication Data

US 2007/0145768 A1 Jun. 28, 2007

(30) Foreign Application Priority Data

Dec. 28, 2005 (JP) ............................. 2005-378022

(51) Int. Cl.
*B62D 25/00* (2006.01)

(52) U.S. Cl. .................... 296/146.5; 296/191; 296/56; 296/146.7

(58) Field of Classification Search ................ 296/191, 296/203.04, 56, 146.5–146.8, 106
See application file for complete search history.

(56) References Cited

U.S. PATENT DOCUMENTS

| | | | | |
|---|---|---|---|---|
| 3,331,627 A | * | 7/1967 | Alber et al. ............. | 296/181.2 |
| 4,973,102 A | * | 11/1990 | Bien ...................... | 296/187.01 |
| 5,150,944 A | * | 9/1992 | Yoshida et al. ......... | 296/203.01 |
| 5,531,499 A | | 7/1996 | Vecchio et al. | |
| 5,603,548 A | | 2/1997 | Gandhi et al. | |
| 6,019,418 A | * | 2/2000 | Emerling et al. ........ | 296/146.8 |
| 6,409,249 B1 | * | 6/2002 | Han ........................ | 296/146.7 |
| 6,412,852 B1 | * | 7/2002 | Koa et al. ................ | 296/146.7 |
| 6,415,636 B1 | * | 7/2002 | Fukumoto et al. ........... | 70/208 |
| 6,508,035 B1 | * | 1/2003 | Seksaria et al. .............. | 49/502 |
| 6,805,398 B2 | * | 10/2004 | Harima et al. ............. | 296/146.7 |
| 6,860,537 B2 | * | 3/2005 | Seksaria et al. ............ | 296/56 |
| 7,059,659 B2 | * | 6/2006 | Smith et al. ............. | 296/146.7 |

FOREIGN PATENT DOCUMENTS

| | | |
|---|---|---|
| FR | 2 870 802 | 12/2005 |
| GB | 1 469 323 | 4/1977 |
| JP | 2004-027563 | 1/2004 |
| WO | 2004/060705 | 7/2004 |

\* cited by examiner

*Primary Examiner*—Dennis H. Pedder
*Assistant Examiner*—Mike Hernandez
(74) *Attorney, Agent, or Firm*—Rankin, Hill & Clark LLP

(57) ABSTRACT

This door construction for a vehicle has a door main body which includes: an inner panel on a cabin interior side; an outer panel on a cabin exterior side; and an interior decoration cover disposed on the cabin interior side of the inner panel. The interior decoration cover is joined to the outer panel through an opening formed in the inner panel.

9 Claims, 5 Drawing Sheets

ND OOR CONSTRUCTION FOR VEHICLE

BACKGROUND OF THE INVENTION

Priority is claimed on Japanese Patent Application No. 2005-378022, filed Dec. 28, 2005, the contents of which are incorporated herein by reference.

1. Field of the Invention

The present invention relates to a door construction for a vehicle, such as a back door.

2. Description of the Related Art

An ordinary door for a vehicle is constructed by: unitarily joining an inner panel on a cabin interior side and an outer panel on a cabin exterior side; and attaching an interior decoration cover facing the cabin interior side, thereto (for example, refer to Japanese Unexamined Patent Application, First Publication No. 2004-27563).

In this conventional door construction, since the interior decoration cover is fixed to a cabin interior side face of the inner panel by screws and clips, it was necessary to secure a face on the inner panel for attaching the interior decoration cover thereto. As a result, space for forming openings in the inner panel is limited; therefore, it was difficult to lighten the weight of the door.

In addition, in the case in which openings formed in the inner panel are enlarged, additional brackets or the like are required to be installed thereto, in order to attach the inner panel. As a result, the number of parts increases; and therefore a concern arises with regard to increases in weight and manufacturing cost thereof.

The present invention was made in view of the above-mentioned circumstances, and has an object of providing a door construction for a vehicle which enables reductions in total weight of a door and manufacturing cost by attaching an interior decoration cover to an interior side of an inner panel without causing a limitation of space for forming openings in the inner panel, and an increase in the number of parts.

SUMMARY OF THE INVENTION

The present invention employed the followings in order to achieve the above-mentioned object.

That is, a door construction for a vehicle of the present invention includes a door main body which has: an inner panel on a cabin interior side; an outer panel on a cabin exterior side; and an interior decoration cover disposed on the cabin interior side of the inner panel. The interior decoration cover is joined to the outer panel through an opening formed in the inner panel.

According to the door construction, since the interior decoration cover is joined with the outer panel through the opening in the inner panel, the inner panel can be prevented from having a limitation for forming openings. That is, according to this door construction, the interior decoration cover is directly joined with the outer panel through the opening in the inner panel; therefore, the interior decoration cover can be attached without additionally providing special brackets or the like for mounting it, while maintaining the size of the opening sufficiently large. As a result, it is possible to reduce the total weight of the door main body and the manufacturing cost.

The door construction for a vehicle may further include resin-made exterior decoration cover which is provided on the cabin exterior side of the outer panel and covers, from the cabin exterior side, a connection between the interior decoration cover and the outer panel.

In this case, since the resin-made exterior decoration cover covers the cabin exterior side of the connection between the interior decoration cover and the outer panel, the appearance quality of the vehicle can be improved.

The outer panel may have a step portion formed thereon at a periphery of a position connecting with the interior decoration cover.

In this case, the rigidity of the periphery of the connection can be increased by the formed step portion.

The interior decoration cover may have a protruding portion formed therein which protrudes toward the cabin exterior side through the opening and is joined with the outer panel.

In this case, the protruding portion is formed on the interior decoration cover which is made of resin material or the like and has a comparatively higher degree of freedom in molding; therefore, it is possible to enhance facility of manufacturing and to thereby decrease the manufacturing cost thereof.

The protruding portion may have a concave portion formed on the cabin interior side thereof, for operating the door main body.

In this case, while operating the door main body, operating power applied to the concave portion will be transferred to the outer panel through the protruding portion. Therefore, since the concave portion for operating the door main body is provided by utilizing the protruding portion of the interior decoration cover, it is possible to enhance facility of manufacturing and to thereby further decrease the manufacturing cost thereof.

The door construction for a vehicle may further include a sealing device provided at a connection between the interior decoration cover and the outer panel.

In this case, the sealing device will prevent water drops from getting into the cabin interior side through the connection. Therefore, production of rust can be prevented. Furthermore, the comfort inside the cabin can be further increased by preventing the increase of humidity inside the cabin in advance.

It may arranged such that the interior decoration cover covers a lower portion of the inner panel from the cabin interior side, and is joined with the outer panel through openings formed in the inner panel at a middle position and lower corners.

DETAILED DESCRIPTION OF THE INVENTION

One embodiment of a door construction for a vehicle of the present invention will be explained below with reference to FIGS. 1 to 5.

Figure 1:
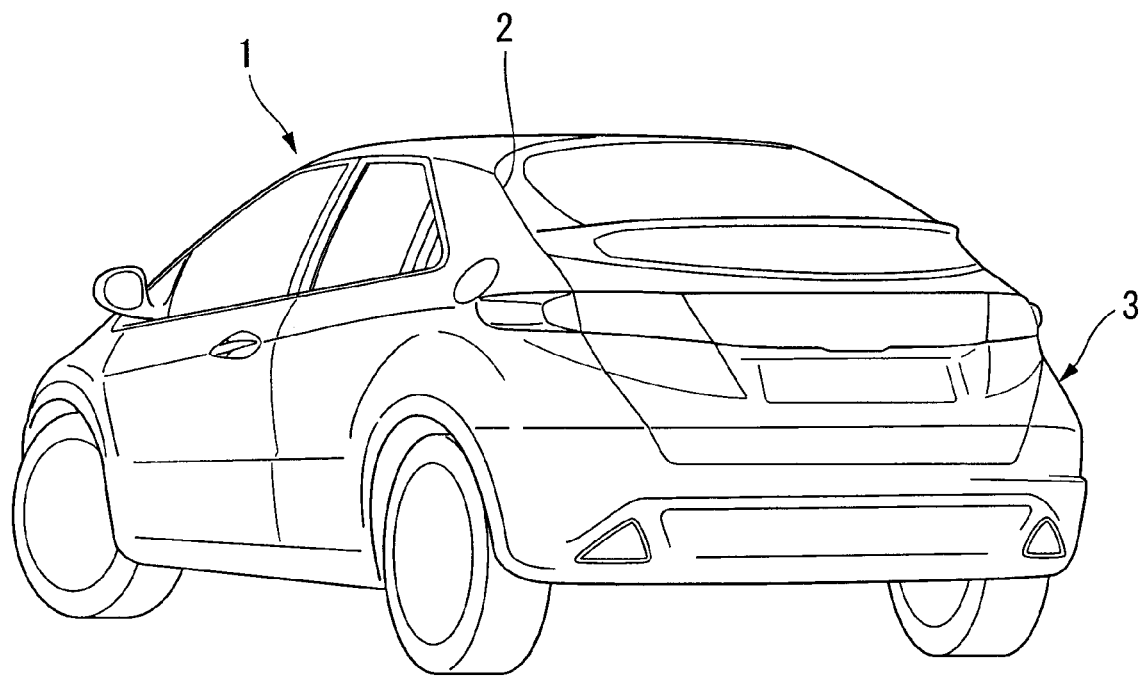
FIG. 1 shows a perspective view of a vehicle having one embodiment of a door construction of the present invention, when the vehicle is viewed from a rear side thereof.

In FIG. 1, the reference symbol 1 denotes a vehicle provided with the door construction of the present embodiment. A door opening 2 is provided on the rear of a vehicle body of the vehicle 1. A tailgate (a door) 3 is attached to the door opening 2 via non-illustrated hinged brackets so as to be openable and closable in the vertical direction.

Figure 2:
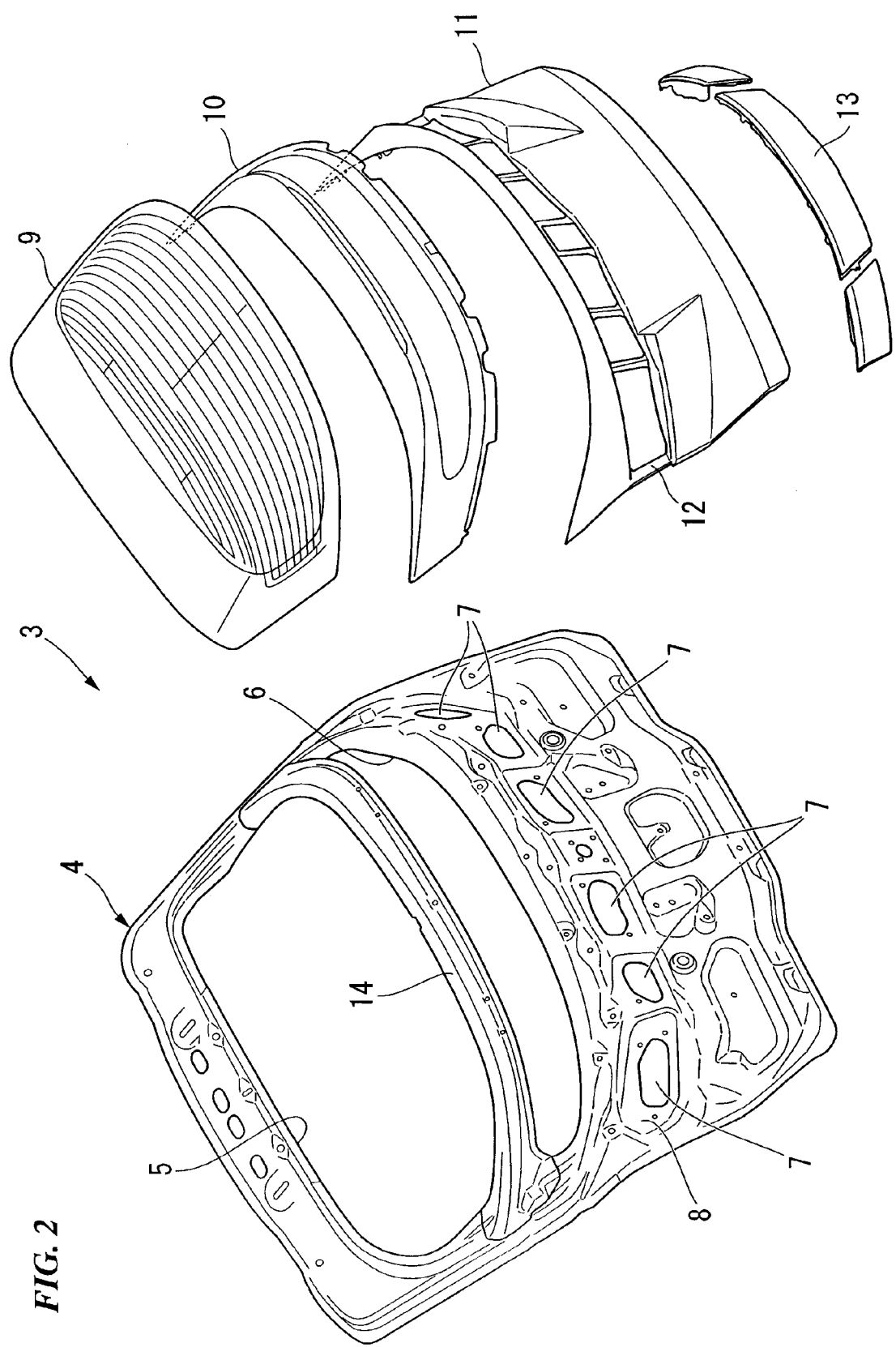
FIG. 2 shows an exploded perspective view of components on a cabin exterior side, of the door construction.

As shown in FIG. 2, the tailgate 3 is provided with a frame unit 4 (a door main body) formed from steel plate material. The frame unit 4 is provided with, from the top side to the bottom side, an opening 5 for mounting a glass, an opening 6 for mounting exterior plates, and a rear light arranging portion 8 having a plurality of holes 7. A resin-made interior decoration cover 25 is attached onto a cabin interior side face of the frame unit 4. The plurality of exterior plates made from resin, glass, or the like are attached onto a cabin exterior side face of the frame unit 4.

In more detail, a door glass 9 is mounted into the opening 5 for mounting a glass. In addition, a glass-made extra window panel 10 and a resin-made lower garnish are mounted into the opening 6 for mounting an exterior plate so as to be arranged in the vertical direction. Openings 12 for mounting lights are formed in the lower garnish 11, and rear lights 13 are mounted into the openings 12 so as to be arranged in the vehicle width direction.

Figure 3:
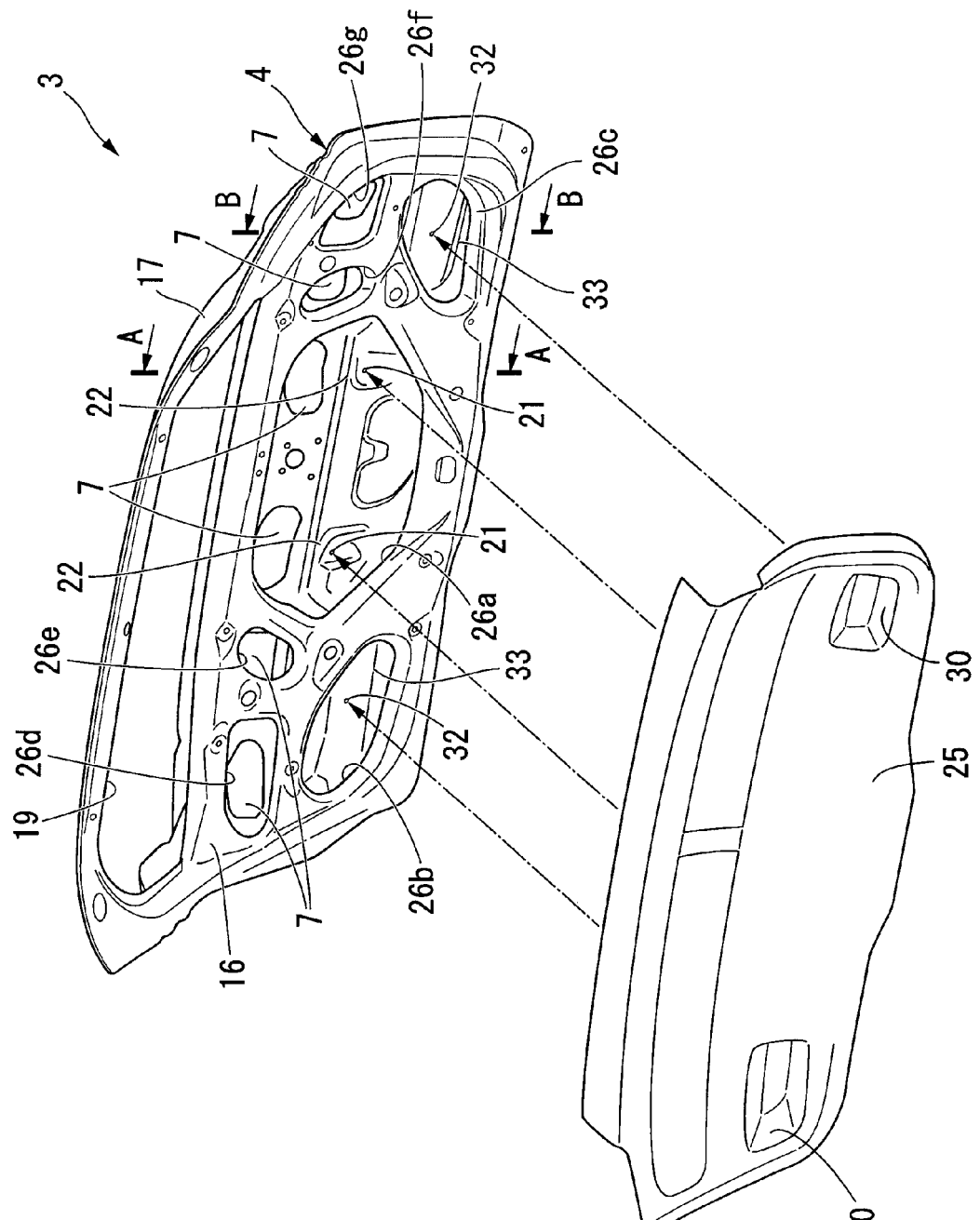
FIG. 3 shows an exploded perspective view of components on a cabin interior side, of the door construction.
Figure 4:
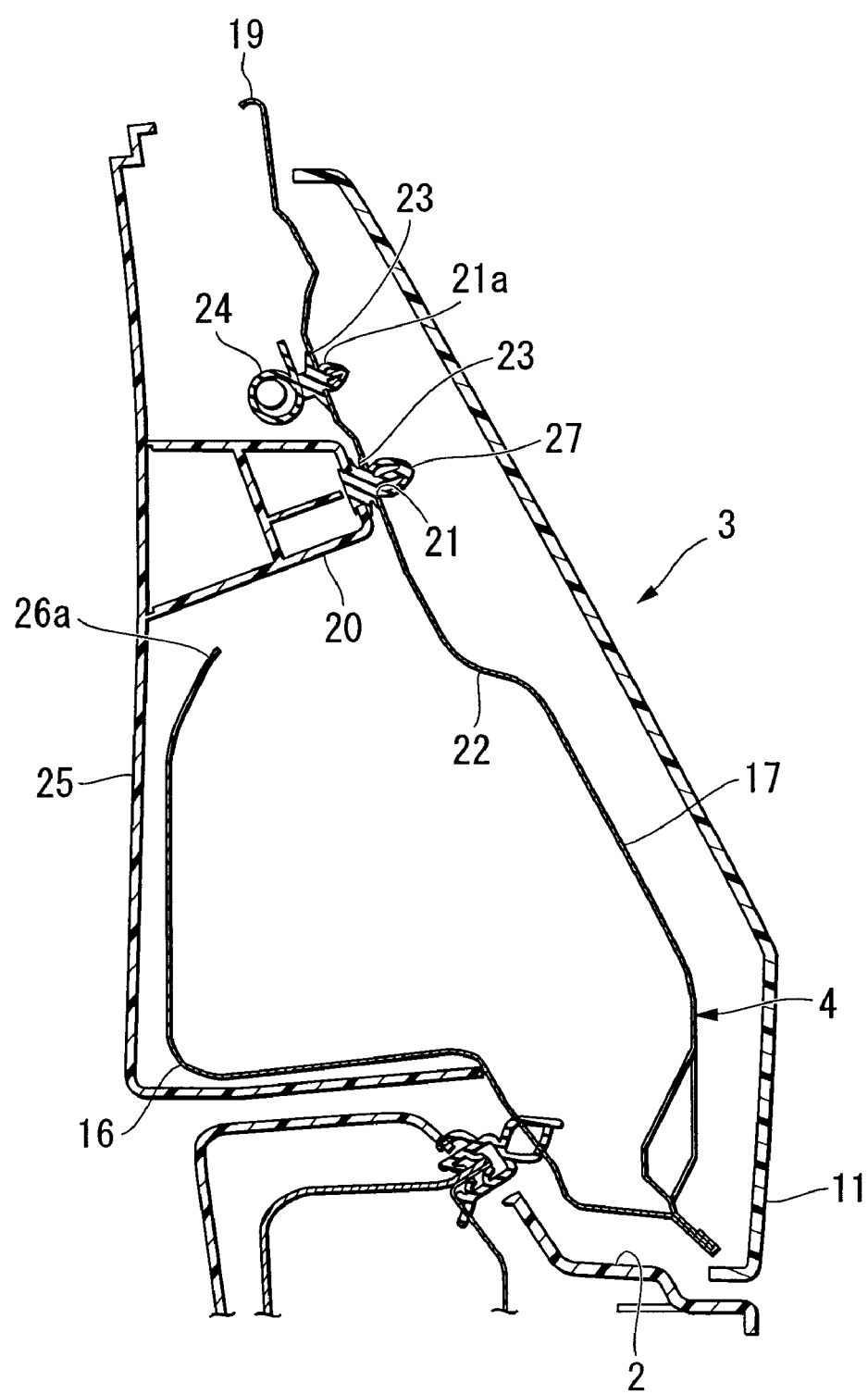
FIG. 4 shows the door construction, on a cross-section A-A of FIG. 3.
Figure 5:
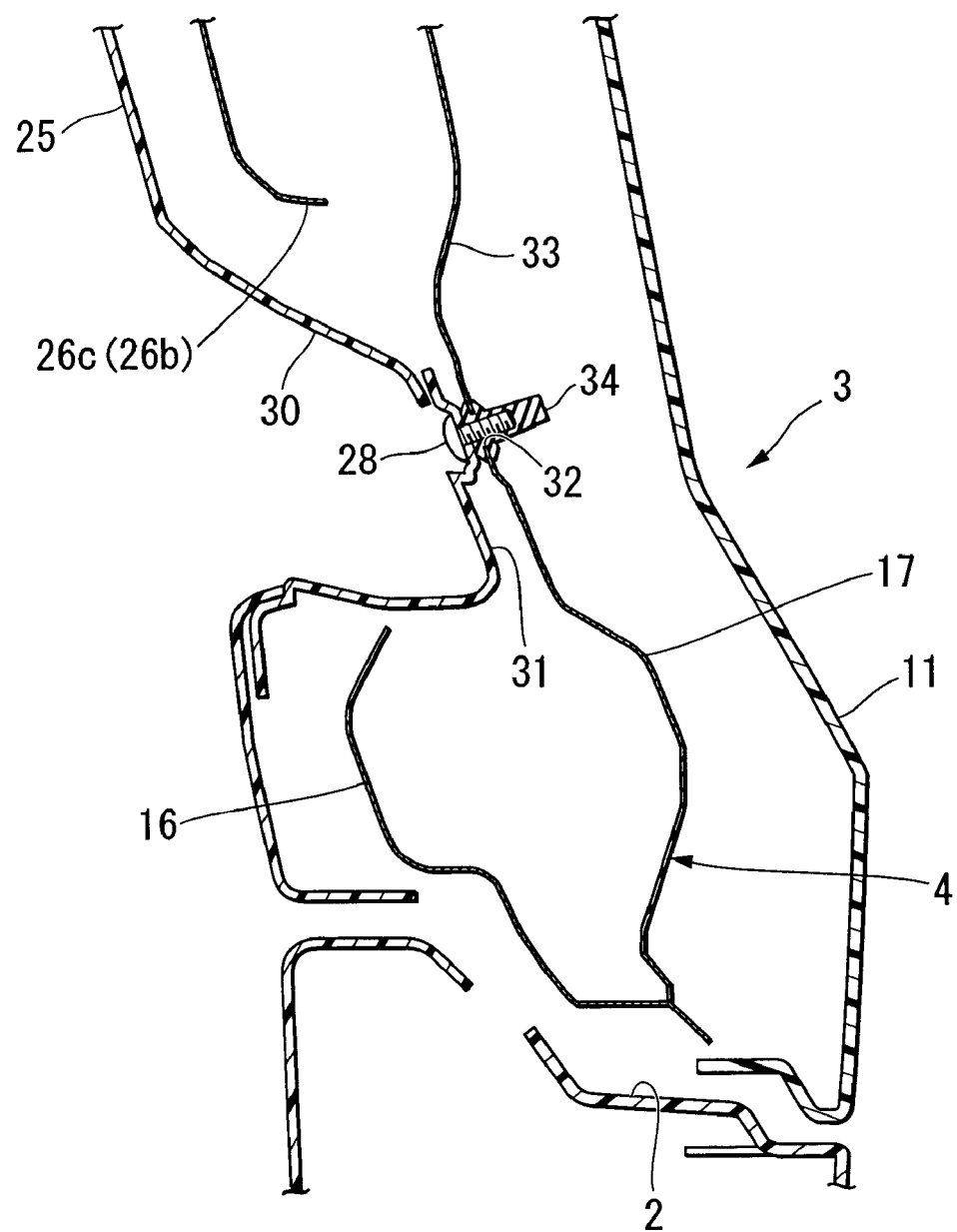
FIG. 5 shows the door construction, on a cross-section B-B of FIG. 3.

As shown in FIGS. 3 to 5, the frame unit 4 is composed of an inner panel 16 on the cabin interior side and an outer panel 17 on the cabin interior side. An outer periphery of the inner panel 16 is unitarily joined with an outer periphery of the outer panel 17 by hemming. A frame opening 19 is formed in each of middle upper portions of the inner panel 16 and the outer panel 17 in order to mount the door glass 9 and the extra window panel 10. A periphery of the frame opening 19 is formed so as to have a closed cross-sectional shape in the cross section. Moreover, between the opening 5 for mounting a glass and the opening 6 for mounting an exterior plate shown in FIG. 2 are demarcated by a lateral beam 14 bridging over a frame opening 19 in the lateral direction.

As shown in FIG. 3, a plurality of openings 26a to 26g is formed under the frame opening 19 of the inner panel 16. The tailgate 3 is lightened by forming these openings 26a to 26g. The opening 26a located at the center of the inner panel 16 is formed such that an upper side thereof has the width which substantially surrounds two holes 7 located at a center of the outer panel 17, and a lower side thereof reaches near a lower edge portion of the inner panel 16. As a result, the opening 26a is formed so as to have a larger opening than those of the other openings 26b to 26g. The two openings 26b and 26c are formed in the inner panel 16 at corner positions thereof on the left side and the right side of the opening 26a. In addition, the openings 26d to 26g are formed at locations corresponding to those of the holes 7 which are respectively formed by two on the left side and the right side of the outer panel 17.

The above-mentioned interior decoration cover 25 which covers a portion lower than the frame opening 19 from the cabin interior side is disposed on the cabin interior side of the inner panel 16. As shown in FIGS. 4 and 5, the interior decoration cover 25 is joined with the rear face of the outer panel 17 through the center opening 26a and the openings 26b and 26c at the lower corners.

In more detail, the interior decoration cover 25 is provided with a pair of protruding portions 20 which protrude toward the rear face (toward the cabin exterior direction) of the outer panel 17 at positions which are near the center of the interior decoration cover 25 and are separated from each other in the horizontal direction. These protruding portions 20 pass though the center opening 26a of the inner panel 16 and are fixed to the outer panel 17 by resin clips 27. Clip attaching holes 21 are formed in the outer panel 17 at locations where the resin clips 27 are to be inserted, and a step portion 22 is formed by press working at the periphery of the clip attaching holes 21. Each distal end of the resin clips 27 is fittingly inserted into the corresponding clip attaching holes 21 while the proximal end thereof is fixed to the protruding portions 20. A ring-shaped sealing flange 23 (a sealing device) is unitarily provided to a bottom portion of the resin clip 27 which protrudes from the protruding portion 20, and the sealing flange 23 fittingly contacts with a periphery of the clip attaching holes 21. The sealing flange 23 is provided at a connection between the interior decoration cover 25 and the outer panel 17, and thereby preventing water droplets from getting into the cabin interior side through the connection (the clip attaching holes 21). Moreover, as shown in FIG. 4, other clip attaching holes 21a are formed on the outer panel at a location above the clip attaching holes 21, and a resin clips 24 for engaging a harness are attached to the clip attaching holes 21a. Each of the resin clip 24 also has the sealing flange 23 formed therearound which fittingly contacts with the periphery of the clip attaching holes 21a.

As shown in FIG. 3, a pair of concave-shaped gripping portions 30 (a concave portion) is formed in the interior cover 25 at the lower left corner and the lower right corner thereof which are being gripped when an operator opens the tailgate 3 by pushing it. As shown in FIG. 5, in each gripping portion 30, a part of the rear face (a cabin exterior side face) of the interior decoration cover 25 protrudes toward a location close to the outer panel 17, and the protruding portion 31 is fixed to the outer panel 17 by a screw 28. An attaching hole 32 is formed in the outer panel 17 at a location where the screw 28 is to be fixed, and a step portion 33 is formed by press working at the periphery of the clip attaching hole 32. A grommet 34 (a sealing device) having a tapped hole is attached to the attaching hole 32. The above-mentioned screw 28 for attaching the interior decoration cover 25 is screwed to the grommet 34. The grommet 34 prevents water droplets from getting into the cabin interior side through a connection (the attaching hole 32) between the interior decoration cover 25 and the outer panel 17.

The above-mentioned resin clips 24 and 27 and the grommets 34 are exposed on the cabin exterior side of the outer panel 17 at locations where the interior decoration cover 25 is fixed and at therearound. However, these exposed portions cannot be seen from the cabin exterior side, since the resin-made lower garnish 11 is disposed on the outer side (the cabin exterior side) than the exposed portions so as to cover them.

As has been explained in the above, in the door construction of the present embodiment, instead of joining the interior decoration cover 25 to the inner panel 16, the interior decoration cover 25 is joined with the outer panel 17 through openings 26a, 26b, and 26c formed in the inner panel 16. Therefore, the interior decoration cover 25 can be reliably fixed to the frame unit 4 (a door main body) without adding special brackets or the like for attaching the interior decoration cover 25, while maintaining large opening areas of the openings 26a, 26b, and 26c in the inner panel 16. Accordingly, with this door construction, it becomes possible to achieve both of the lightening the entire of the tailgate 3, and the reduction in manufacturing cost of the tailgate 3.

In addition, in this door construction, the protruding portions 20 and 31 which are to be inserted into the openings 26a, 26b, and 26c of the inner panel 16 are formed on the interior decoration cover 25 which is made of resin material and has a comparatively higher degree of freedom in molding; therefore, it is possible to enhance facility of manufacturing and to thereby decrease the manufacturing cost thereof.

Furthermore, in this door construction, the gripping portions 30 are provided on the cabin interior side face of the interior decoration cover 25 by utilizing the protruding portions 31 formed at the lower corners of the interior decoration cover 25. Therefore, it becomes possible to enhance facility of manufacturing the gripping portions 30 and to thereby further decrease the manufacturing cost thereof. In addition, the locations of the gripping portion 30 (the protruding portion 31) where is near the locations to which operating power is applied, is directly joined with the outer panel 17 by screw; therefore, the operating power can be transferred efficiently to the metal frame unit 4.

In addition, in this door construction of the present embodiment, the step portions 22 and 23 are formed by press working the outer panel 17 at the peripheries of the connections with the interior decoration cover 25 (fixing portions where the clips 24 and 27, and screws 28 are attached); therefore, the rigidity of the peripheries of the connections can be increased. In addition, in the present embodiment, the connections of the outer panel 17 will not be exposed to the cabin exterior side, and the cabin exterior side thereof are covered with the resin-made lower garnish 11; therefore, it is possible to increase the strength thereof by performing the press work in a comparatively free manner.

Furthermore, in the present embodiment, the peripheries of the attaching holes 21 and 32 in the outer panel 17 which are the connections between the interior decoration cover 25 and the outer panel 17, are reliably sealed by the sealing portions of the resin clip 27 and grommet 34. Therefore, it is possible to reliably prevent water droplets from falling along the outside surface of the outer panel 17, and invading the interior decoration cover 25 through the attaching holes 21 and 32.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Moreover, for example, in the above-mentioned embodiment, the door construction of the present embodiment is applied to the tailgate which vertically opens and closes; however, it could also be applied to a tailgate which horizontally opens and closes. Furthermore, in addition to the tailgate, the present invention is also applicable to other doors such as side doors.

What is claimed is:

1. A door construction for a vehicle having a door main body comprising:

an inner panel on a cabin interior side;

an outer panel on a cabin exterior side, wherein a first periphery of the inner panel is unitarily joined with a second periphery of the outer panel; and an interior decoration cover disposed on the cabin interior side of the inner panel, wherein the interior decoration cover is joined to the outer panel through an opening formed in the inner panel.

2. The door construction for a vehicle according to claim 1, further comprising a resin-made exterior decoration cover which is provided on the cabin exterior side of the outer panel and covers, from the cabin exterior side, a connection between the interior decoration cover and the outer panel.

3. The door construction for a vehicle according to claim 1, wherein the outer panel has a step portion formed thereon at a periphery of a position connecting with the interior decoration cover.

4. The door construction for a vehicle according to claim 1, wherein the interior decoration cover has a protruding portion formed therein which protrudes toward the cabin exterior side through the opening and is joined with the outer panel.

5. The door construction for a vehicle according to claim 4, wherein the protruding portion has a concave portion formed on the cabin interior side thereof, for operating the door main body.

6. The door construction for a vehicle according to claim 1, further comprising a sealing device provided at a connection between the interior decoration cover and the outer panel.

7. The door construction for a vehicle according to claim 1, wherein the interior decoration cover covets a lower portion of the inner panel from the cabin interior side, and is joined with the outer panel through openings formed in the inner panel at a middle position and lower corners.

8. The door construction for a vehicle according to claim 1, wherein the inner panel and the outer panel are formed from steel plate material.

9. The door construction for a vehicle according to claim 1, wherein the inner panel is a rigid support member providing support for the outer panel.

* * * * *

UNITED STATES PATENT AND TRADEMARK OFFICE
CERTIFICATE OF CORRECTION

PATENT NO. : 7,380,866 B2
APPLICATION NO. : 11/612839
DATED : June 3, 2008
INVENTOR(S) : Saitoh et al.

It is certified that error appears in the above-identified patent and that said Letters Patent is hereby corrected as shown below:

Column 6, Line 41, (Claim 7, Line 3), delete "covets" and insert --covers--.

Signed and Sealed this

Nineteenth Day of August, 2008

JON W. DUDAS
*Director of the United States Patent and Trademark Office*